April 19, 1955  H. L. OLSON ET AL  2,706,445
BREAD TOASTERS
Filed Jan. 16, 1950  3 Sheets-Sheet 1
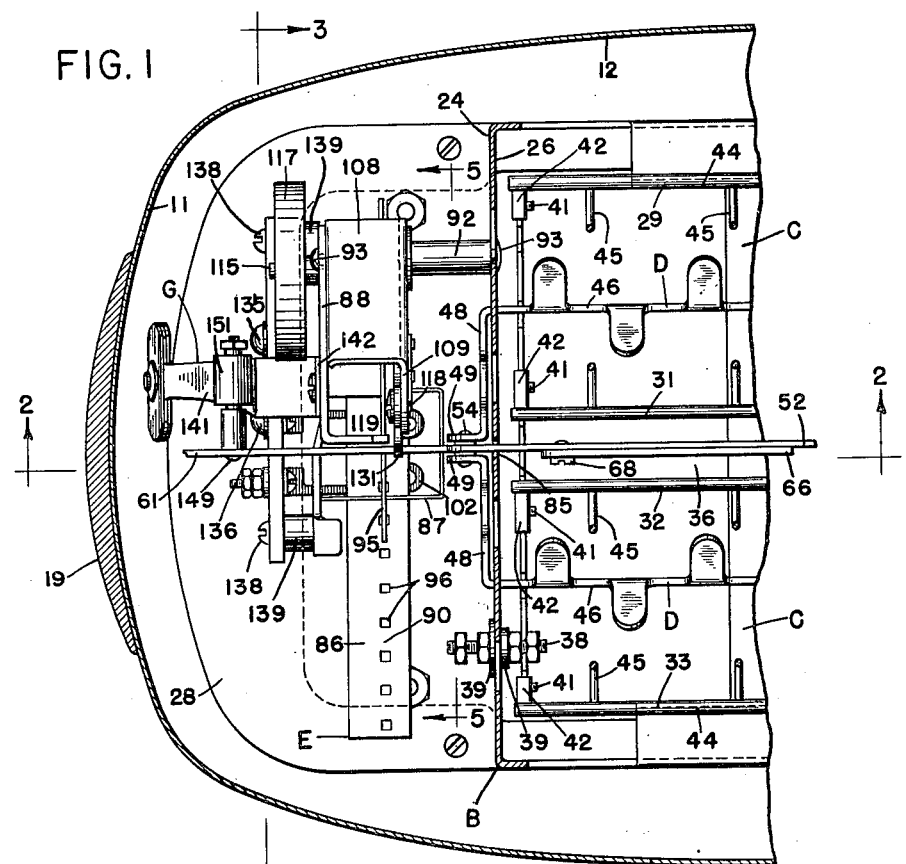
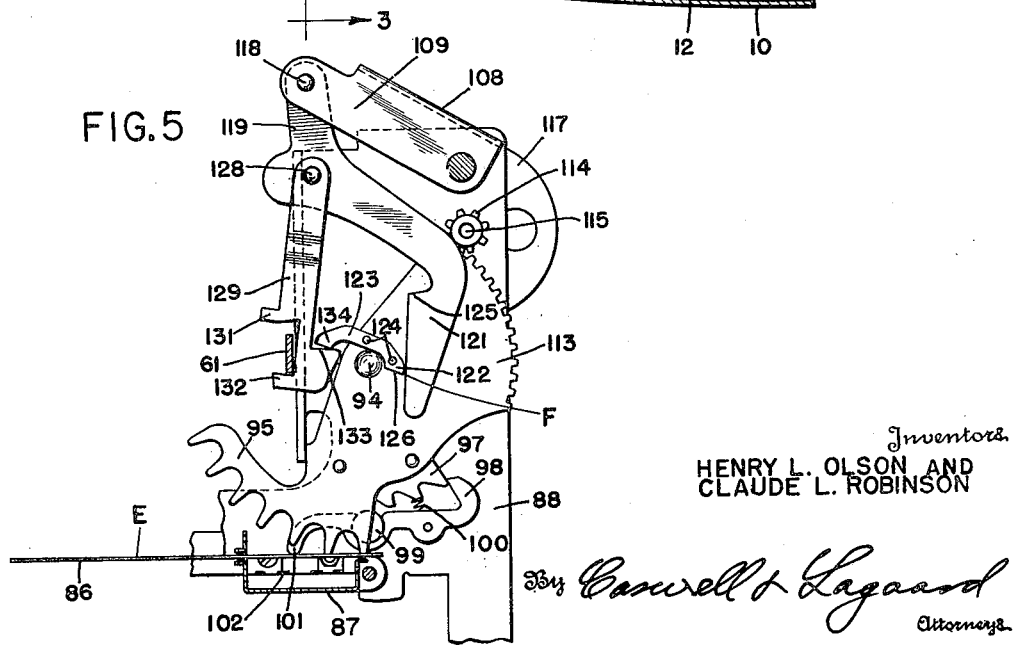
Inventors.
HENRY L. OLSON AND
CLAUDE L. ROBINSON
By Caswell & Lagaard
Attorneys.

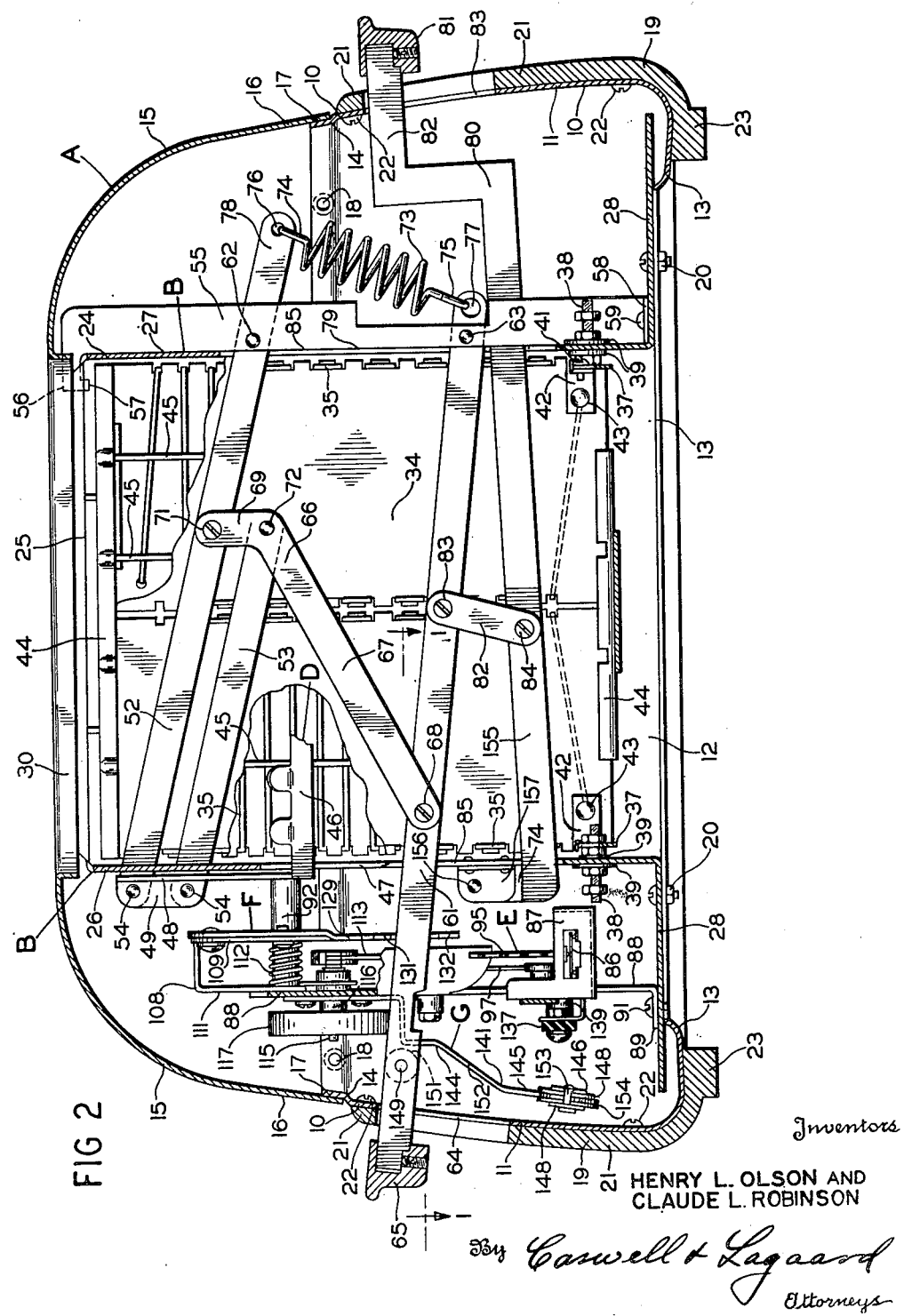

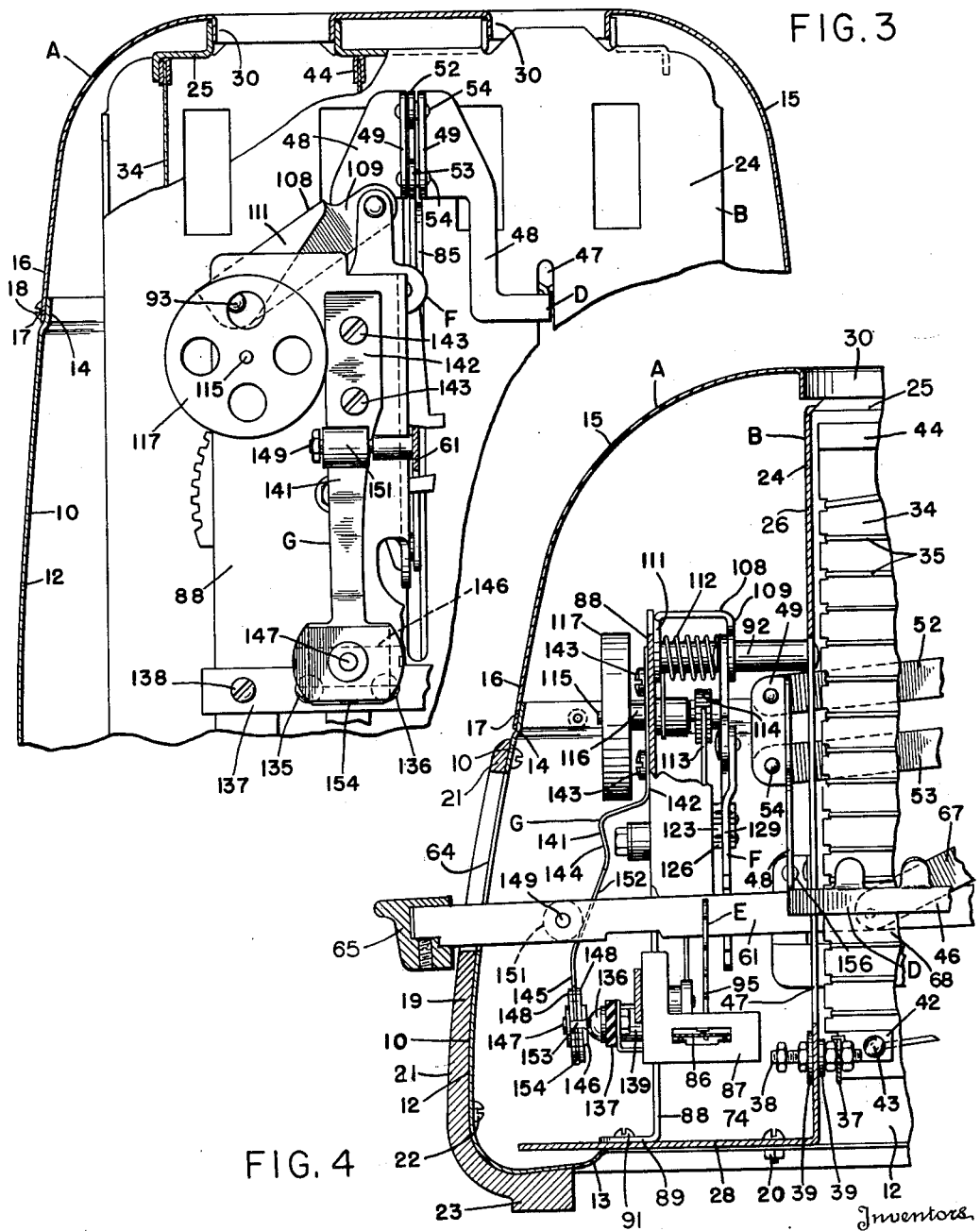

[Patent No.] 2,706,445
[Patented] Apr. 19, 1955

2,706,445
BREAD TOASTERS

Henry L. Olson, Grand Haven, and Claude L. Robinson, Spring Lake, Mich., assignors to Camfield Manufacturing Company, Grand Haven, Mich., a corporation of Michigan Application January 16, 1950, Serial No. 138,758

4 Claims. (Cl. 99—391)

The herein disclosed invention has for an object to provide a bread toaster in which the toaster may be operated from either end thereof.

Another object of the invention resides in providing a toaster having spaced heating elements forming two bread ovens provided with bread racks therein movable in and up and down direction and in further forming a space therebetween in which the supporting and operating mechanism for the bread racks is disposed.

An object of the invention resides in providing a frame for supporting the heating elements and bread racks and having first and second end frame members, and in providing attaching means for connecting the bread racks together.

A still further object of the invention resides in pivoting to said attaching means two levers extending through one of said end frame members and into said space and in further providing a pivot for one of said levers at the other end frame member.

An object of the invention resides in providing an operating lever extending into said space and below said first named levers and in providing a pivot therefor at the same end frame member at which said previously referred to lever is pivoted.

Another object of the invention resides in providing a link pivoted to all of said levers and in arranging the axes of the pivots to said first named levers in a plane parallel to a plane containing the axes of the pivots of said levers to said connecting means.

A still further object of the invention resides in arranging the pivots for said links so that a lever advantage is procured between said first named levers and said operating lever whereby the bread racks move a greater distance than the end of the operating lever.

Another object of the invention resides in providing a second operating lever extending into said space and below said first operating lever, and in providing a pivot therefor at the opposite end frame member the first operating lever is pivoted. An object of the invention resides in providing a link pivotally connecting said operating levers together.

A still further object of the invention resides in providing said second operating lever with an offset whereby the ends of said levers lie at substantially the same elevation.

Other objects of the invention reside in the novel combination and arrangement of parts and in the details of construction hereinafter illustrated and/or described.

The bread toaster herein disclosed consists of a case A in which is disposed a framework B. This framework includes two spaced end frame members. A number of heating elements disposed within the framework B form two spaced bread ovens C and provide a space therebetween. In the bread ovens C are disposed two vertically movable bread racks D which support the bread and which are spring biased to non-toasting position. These bread racks extend through one of said end frame members and are connected together exteriorly thereof through suitable attaching means. Two levers are pivoted to this attaching means and extend into said space, the one lever being pivoted at the other end frame member. Within said space is disposed two operating levers each pivoted at one end frame member and extending through the other frame member. A link is pivoted to the first named levers and to one of said operating levers and the pivots therefor are arranged so that the bread racks remain horizontal throughout the movement thereof and so that said bread racks move a greater distance than the ends of the operating levers. A timing device E is adapted to determine the cooking period and operates to release a latching device F whereupon the bread racks are returned to normal position at the end of the cooking period. The timing mechanism includes a revoluble member having catch engaging means forming part of the latching device F and adapted to be engaged by a catch formed on a latch movable with the bread racks and also forming part of the latching device F.

In the drawings:

Fig. 1 is a plan sectional view of a portion of an electric toaster illustrating an embodiment of our invention and taken substantially on line 1—1 of Fig. 2.

Fig. 2 is a longitudinal elevational sectional view of the toaster taken substantially on line 2—2 of Fig. 1.

Fig. 3 is a fragmentary cross sectional view taken substantially on line 3—3 of Fig. 1.

Fig. 4 is a fragmentary longitudinal sectional view similar to Fig. 2 and showing the parts in altered position.

Fig. 5 is a fragmentary elevational sectional view taken on line 5—5 of Fig. 1.

The case A of the invention as best shown in Fig. 2 consists of a lower case section 10 which extends about the entire toaster and which has ends 11 and sides 12. The lowermost part of the case section 10 has a flange 13 extending inwardly therefrom and on which the toaster mechanism rests. The upper part fo the section 10 has an offset 14 formed in the same and which provides a recess 17. Overlying the section 10 is an upper case section 15. This case section is dome-shaped in form and the lower marginal portion 16 of said case section is received within the recess 17 formed by the offset 14. Screws 18 extending through the lowermost marginal portion 16 and threaded into the offset 14 hold the parts of the case assembled. Attached to the ends 11 of case section 10 are end pieces 19 which are preferably constructed of some plastic material and which form ornaments for dressing up the case structure. These end pieces have body portions 21 which overlie the ends 11 of the case and are secured thereto by means of screws 22. These end pieces furthermore have feet 23 which are disposed beneath the section 10 and support the entire toaster above the table on which it rests to provide ventilation and retard the transfer of heat to the table. The secion 15 of the case A is constructed with openings 30 which register with the bread ovens C and through which the bread may be inserted into said ovens and placed upon the bread racks D.

Within the case A is located the framework B which supports the mechanism of the invention. This framework consists of a frame 24, of inverted U-shaped form, having an upper longitudinally extending frame member 25 and two vertically extending end frame members 26 and 27 connected thereto. The frame members 26 and 27 have flanges 28 projecting outwardly therefrom and lying in a common plane. These flanges rest upon the flange 13 and support the frame structure through the lower case section 10. Screws 20 hold the framework B attached to the case A.

Within the framework B is provided four heating elements 29, 31, 32 and 33 which consist of sheets of mica 34 on which are wound suitable resistors 35. These heating elements in conjunction with the vertical frame members 26 and 27, form the two bread ovens C which are disposed between the heating elements 29 and 31 and between the heating elements 32 and 33. The heating elements 31 and 32 are also separated from one another to form a space 36 therebetween and in which certain of the mechanism of the invention is disposed. For supporting the heating elements 29, 31, 32 and 33 two bars 37 are employed which extend transversely of the frame members 26 and 27 and are attached thereto by means of screws 38. The said screws are insulated from the frame by insulating washers 39. Other screws 41 extend through said bars and through angle brackets 42 secured to the various heating elements by means of rivets 43. The heating elements 29, 31, 32 and 33 have reinforcing strips 44 secured to the upper and lower ends of the same and which also serve for attachment of guide wires 45.

These guide wires are spaced from the resistors 35 and prevent the toast from coming in direct contact therewith and burning.

For supporting the toast within the oven C the two bread racks D are employed. These bread racks consist of elongated bars 46 which extend through slots 47 in the vertical frame members 26 and 27 and are guided for vertical movement therein. One end of each of said bars has an arm 48 bent outwardly therefrom and which terminates in a lug 49. The lugs 49 straddle two levers 52 and 53 and are pivotally connected thereto by means of rivets 54.

The lever 52 is pivoted to an upright 55 by means of a rivet 62. This upright is secured to the frame B in the following manner: The upper end of said upright has a finger 56 which extends over the horizontal frame member 25 and is formed with a lug 57 which projects downwardly through said frame member. The lower end of the upright 55 has a flange 58 projecting outwardly therefrom which is secured by means of a rivet 59 to the flange 28 of frame 24. Another lever 61 hereinafter referred to as an operating lever is also pivoted to the upright 55 by means of a rivet 63 and extends through slots 85 in the frame member 24 and through a slot 64 in one of the ends 11 of the case section 10. This lever forms the operating member by means of which the bread racks D are moved into toasting position and by means of which the said bread racks may be subsequently released. The lever 61 has attached to it a knob 65 by which said lever may be depressed. Extending between the lever 52 and the lever 61 is a link 66 which has one long arm 67 pivoted to the lever 61 by means of a screw 68. The said link has a short arm 69 which is pivoted to the lever 52 by means of a screw 71. These arms are angularly arranged with respect to one another. Lever 53 is pivoted to the link 66 by means of a rivet 72. It will be noted that a plane containing the axes of the screw 71 and the rivet 72 lies parallel with a plane containing the axes of the two rivets 54. This causes the bread racks D to remain horizontal throughout the movement thereof. The angularity of the arms 69 and 67 of link 66 permit of connecting the said link to the levers 52 and 61 so that the distance between rivet 62 and screw 71 is less than the distance between rivet 63 and screw 68. This gives a lever advantage which causes the bread racks to travel a greater distance than the end of the lever 61. The ends of both of the levers 52 and 61 project outwardly beyond the vertical frame member 27. These ends of said levers have attached to them a tension coil spring 73 which has its ends 74 and 75 hooked into holes 76 and 77 in said levers. The end 78 of the lever 52 projects outwardly beyond the upright 55 an appreciable amount so that considerable movement is given to the lever 52 tending to urge the said lever upwardly and to move the bread racks D into non-toasting position.

In addition to the operating lever 61 another operating lever 155 is employed which is also disposed in the space 36 and which is situated below the lever 61. This lever extends through the end frame member 26 and is pivoted by means of a rivet 156 to a bracket 157 secured to said frame member. Lever 155 extends through and is operable in a slot 79 formed in the end frame member 27. This lever has an upwardly extending offset 80 which clears the spring 73 and which terminates in an extension 82. This extension extends through and is operable in a slot 83 formed in the end 11 of case section 10 and in the end piece 19. A knob 81 similar to the knob 65 is attached to the extension 82. By means of the offset 80 the two knobs 65 and 81 are normally at substantially the same elevation.

The timing mechanism E on the invention is of the type disclosed in the patent to R. Sardeson, 2,365,909, issued December 26, 1944. This timing mechanism includes a strip of bimetal 86 which is mounted for reciprocating movement in a guide 87. Guide 87 is attached to an end plate 88 forming part of the framework B. The end plate 88 has a foot 89 which rests upon and is attached to the flange 28 of frame member 26 by means of a screw 91. The upper end of the said end plate is held in proper relation with the vertical frame member 26 by means of a spacer 92. The ends 93 of said spacer extend through the plate 88 and the vertical frame member 26 and are riveted over as best shown in Fig. 1 to hold the parts attached to one another.

Pivotally mounted on a shaft 94 is a gear segment 95 which is adapted to cooperate with a rack 90 formed on the strip of bimetal 86 by means of spaced openings 96. The shaft 94 is secured to the plate 88. The gear segment 95 has attached to it a section 97 of a ratchet wheel, the teeth of which cooperate with a catch 98. Catch 98 is pivoted on a pintle 99 which is also attached to the plate 88. The said catch includes a finger 101 which rests on the bimetal and which is adapted to be raised to disengage the catch 98 from the section 97 of the ratchet wheel and release the gear segment 95, one tooth at a time. A spring 100 secured to the catch 98 and to the plate 88 urges the finger 101 against the strip of bimetal 86. The bimetal is heated by means of a heater 102 disposed within the guide 87. It will readily be comprehended that the rate of heating of the bimetal determines the length of time required for the operation of the timing mechanism E for each cooking period.

The latching device F includes a U-shaped arm 108 hereinafter referred to as a catch arm which has spaced flanges 109 and 111. This arm is pivotally supported on the spacer 92 which is in the form of a rod and which extends through the two flanges 109 and 111. A torsion spring 112 encircles the spacer 92 between the flanges 109 and 111 and is attached to flange 109 and to the plate 88 to cause said arm to swing normally upwardly as shown in Figs. 3 and 4.

The arm 108 has pivoted to the flange 109 thereof by means of a rivet 118 a depending latch 119. Latch 119 has a catch 121 at the lower end of the same which is formed with a surface 125 adapted to engage a corresponding surface 126 on a catch engaging member 122. This catch member forms part of a bar 123 which is secured to the gear segment 95 by means of rivets 124. Pivotally connected to the latch 119 by means of a rivet 128 is a depending link 129 which forms a connector between the latch 119 and the lever 61. This link is constructed with spaced fingers 131 and 132 at its lower end. These fingers straddle the lever 61 and when the said lever is moved downwardly the said link imparts to the latch 119 downward movement.

A gear segment 113 is formed on the gear segment 95 which is adapted to mesh with a gear pinion 114. This pinion is attached to a shaft 115 which is journaled in a bearing 116 mounted on the plate 88. A fly wheel 117 is also attached to the shaft 115 and the said fly wheel absorbs the energy produced by the spring 103 and allows the bread racks D to move less rapidly to normal position at the end of the timing period.

For resetting the timing device E link 129 is formed with a shoulder 133. This shoulder is adapted to engage a lug 134 on the bar 123 and to rotate the gear segment 95 in a direction opposite to that resulting from the operation of the timing mechanism E, thus resetting the timing mechanism.

The switch mechanism G of the invention includes two fixed contacts 135 and 136 which are mounted on a bar of insulating material 137. This bar is attached to the end plate 88 by means of screws 138. Spacers 139 encircling said screws and disposed between said bar and plate hold the bar spaced therefrom and contacts 135 and 136 free from the end plate 88. The contacts 135 and 136 are connected in the circuit for energizing the heating elements 29 in the customary manner. The switch mechanism G further includes a switch arm 141 which is constructed of resilient sheet material such as spring bronze or the like. The arm 141 has a base portion 142 which overlies the end plate 88 and which is secured thereto by means of screws 143. Outwardly from the base portion 142 is formed an offset 144 which spaces such portion from the end plate 88, and brings the extreme end 145 of said arm outwardly of and opposite the contacts 135 and 136. A movable contact member 146 is attached to the end 145 of arm 141 and insulated therefrom. The contact member 146 when moved into engagement with the contacts 135 and 136 closes the circuit through said contacts and heating elements 29 and causes the same to become energized.

Movement of the switch arm 141 to bring the movable contact member 146 into circuit closing position is accomplished as follows: Pivoted to a pintle 149 attached to lever 61 is a roller 151 which moves with said lever in an up and down direction. Traversing the direction of movement of said roller is a cam 152 which is formed in the intermediate portion of the arm 141 as best shown in Fig. 2. This cam traverses the direction of movement of the roller 151 and as said roller descends upon downward movement of lever 61 said roller engages said cam and forces said cam toward the right as shown in Fig. 2, bringing the contact member 146 into contact with the fixed contacts 135 and 136 as shown in Fig. 4.

The operation of the invention is as follows: The parts are shown in normal position in Figs. 1, 2 and 5. The toaster may be operated from either end. If operated from the end at which knob 65 is located, pressure on this knob will swing lever 61 downwardly. Such movement will be imparted to link 66 which will be correspondingly imparted to levers 52 and 53. Due to the parallelism between the plane containing the axes of screws 71 and rivet 72 and the plane containing the axes of rivets 54 the bread racks D move downwardly and remain horizontal throughout their movement. As the lever 61 moves downwardly it engages finger 132 and moves link 129 downwardly as well as the latch 119. Catch 121 then engages the catch engaging member 122 and holds the bread racks D in toasting position. At the same time roller 151 engages cam 152 and moves the switch contact member 146 into engagement with the fixed contacts 135 and 136. This completes the circuit through the heating elements and energizes the same. The timing mechanism E is now energized by spring 73 and commences to function. As the said mechanism operates, gear segment 95 rotates and the angularity of the surface 126 of catch engaging member 122 is changed till the catch 121 slides off from the same. Spring 73 then returns the parts to normal position. In moving the parts to normal position roller 151 is rapidly moved out of engagement with cam 152 and the switch mechanism G opened. At the same time shoulder 133 engages lug 134 and resets the timing mechanism E. If it be desired to operate the toaster from the other end, knob 81 is depressed. This swings lever 155 downwardly and through link 82, also swings lever 62 downwardly. This lever now functions as previously described to operate the toaster in the aforementioned manner.

The advantages of the invention are manifest. The levers and links for operating the bread racks can be readily formed as stampings and at a relatively small expense. These parts are disposed in the space between the bread ovens thereby requiring but a single set of parts and utilizing space otherwise wasted. By disposing the operating levers in this space control may be had from either end of the toaster. By utilizing the two supporting levers and arranging the pivots as disclosed the bread racks remain horizontal throughout the movement thereof. With the link having angularly disposed arms a lever advantage can be secured causing the racks to move a greater distance than the operating levers.

Changes in the specific form of our invention, as herein described, may be made within the scope of what is claimed without departing from the spirit of our invention.

Having described our invention, what we claim as new and desire to protect by Letters Patent is:

1. In a bread toaster a frame having first and second end frame members, spaced heating elements between said frame members and forming therewith two toasting ovens with a space therebetween, bread racks in said ovens movable in an up and down direction from a toasting to a non-toasting position, said bread racks having parts extending through the first end frame member, attaching means disposed exteriorly of said first end frame member and connecting said bread racks together, an upper lever and a lower lever disposed in said space, pivots between said levers and said attaching means, a pivot for said upper lever disposed at said second end frame member said lower lever being free from said second frame member, an operating lever disposed below said first named levers within said space, a pivot for said operating lever disposed at said second end frame member, said operating lever extending through said first end frame member and a link pivoted to both said upper and lower levers intermediate said frame members and to said operating lever and procuring downward movement of said bread racks upon corresponding movement of said operating lever, said lower lever terminating substantially at said pivot between it and said link and being of lesser length than said upper lever.

2. In a bread toaster a frame having first and second end frame members, spaced heating elements between said frame members and forming therewith two toasting ovens with a space therebetween, bread racks in said ovens movable in an up and down direction from a toasting to a non-toasting position, said bread racks having parts extending through the first end frame member, attaching means disposed exteriorly of said first end frame member and connecting said bread racks together, an upper lever and a lower lever disposed in said space, pivots between said levers and said attaching means, a pivot for said upper lever disposed at said second end frame member said lower lever being free from said second frame member, an operating lever disposed below said first named levers within said space, a pivot for said operating lever disposed at said second end frame member, said operating lever extending through said first end frame member and a link pivoted to both said upper and lower levers at the same distances from the pivots of said levers at the attaching means and to said operating lever, said lower lever terminating substantially at said pivot between it and said link.

3. In a bread toaster a frame having first and second end frame members, spaced heating elements between said frame members and forming therewith two toasting ovens with a space therebetween, bread racks in said ovens movable in an up and down direction from a toasting to a non-toasting position, said bread racks having parts extending through the first end frame member, attaching means disposed exteriorly of said first end frame member and connecting said bread racks together, an upper lever and a lower lever disposed in said space, pivots between said levers and said attaching means, a pivot for said upper lever disposed at said second end frame member, an operating lever disposed below said first named levers within said space, a pivot for said operating lever disposed at said second end frame member, said operating lever extending through said first end frame member, a link having a short arm and a long arm extending angularly from one another, said link being pivoted at its vertex to said lower lever, the short arm being pivoted to said upper lever and the long arm being pivoted to said operating lever.

4. In a bread toaster a frame having first and second end frame members, spaced heating elements between said frame members and forming therewith two toasting ovens with a space therebetween, bread racks in said ovens movable in an up and down direction from a toasting to a non-toasting position, said bread racks having parts extending through the first end frame member, attaching means disposed exteriorly of said first end frame member and connecting said bread racks together, an upper lever and a lower lever disposed in said space, pivots between said levers and said attaching means, a pivot for said upper lever disposed at said second end frame member, said lower lever being free from said second end frame member, an operating lever disposed below said first named levers within said space, a pivot for said operating lever disposed at said second end frame member, said operating lever extending through said first end frame member and a link pivoted to both said upper and lower levers intermediate said end frame members and to said operating lever and procuring downward movement of said bread racks upon corresponding movement of said operating lever, said upper lever and said operating lever having ends extending through and outwardly beyond said second end frame member and a spring acting between said ends, the distance between the locality of attachment of said spring to said upper lever and the pivot therefor to said second frame member being greater than the distance between the locality of attachment of said spring to the operating lever and the pivot between said operating lever and second end frame member to urge said bread racks upwardly and to take up the slack in the linkage between said levers and between said levers and the second end frame member.

References Cited in the file of this patent

UNITED STATES PATENTS

| | | |
|---|---|---|
| 2,091,041 | Hallwood | Aug. 24, 1937 |
| 2,106,824 | Bayne | Feb. 1, 1938 |
| 2,153,689 | Floraday | Apr. 11, 1939 |
| 2,266,045 | Ireland | Dec. 16, 1941 |
| 2,288,699 | Gomersall et al. | July 7, 1942 |
| 2,365,909 | Sardeson | Dec. 26, 1944 |
| 2,542,231 | Campbell | Feb. 20, 1951 |
| 2,622,505 | Olson et al. | Dec. 23, 1952 |